United States Patent
Seidel

(10) Patent No.: US 8,280,646 B2
(45) Date of Patent: Oct. 2, 2012

(54) VEHICLE CO2 EMISSION OFFSETTING SYSTEM AND METHOD

(75) Inventor: Markus Seidel, München (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 716 days.

(21) Appl. No.: 12/392,668

(22) Filed: Feb. 25, 2009

(65) Prior Publication Data
US 2010/0217535 A1  Aug. 26, 2010

(51) Int. Cl.
*G01N 31/00* (2006.01)
*G01N 7/00* (2006.01)
(52) U.S. Cl. .......................... 702/24; 73/23.31
(58) Field of Classification Search .............. 702/24, 702/27, 29–30, 50, 81, 84, 127–128, 182–183, 702/188–189; 73/1.02, 1.06, 23.2, 23.31, 73/114.69, 114.71; 705/1.1, 7.12, 7.23, 7.34, 705/7.38, 7.41, 37
See application file for complete search history.

(56) References Cited

U.S. PATENT DOCUMENTS

| | | | |
|---|---|---|---|
| 5,343,906 A | 9/1994 | Tibbals, III, et al. | |
| 6,382,014 B1 | 5/2002 | Breton | |
| 7,343,341 B2 | 3/2008 | Sandor | |
| 2008/0015975 A1* | 1/2008 | Ivchenko et al. | 705/37 |
| 2009/0069999 A1* | 3/2009 | Bos | 701/102 |

* cited by examiner

*Primary Examiner* — Toan M Le
(74) *Attorney, Agent, or Firm* — Barley Snyder

(57) ABSTRACT

A method of offsetting carbon dioxide (CO2) emissions includes the steps of capturing CO2 emissions data from a vehicle, transmitting the emissions data to a data collection unit, which then stores collected CO2 data and prepares a CO2 emission report. The CO2 emission report is used in preparing a customized CO2 offsetting package, which is selected by a vehicle owner. The selected CO2 offsetting package offsets the CO2 emissions through purchased credits, which neutralize the CO2 released from the vehicle. The owner of the package is given a visual indicator exhibiting that the vehicle is currently carbon neutral.

83 Claims, 18 Drawing Sheets

GREENHOUSE GAS EMISSIONS FROM DIFFERENT FORMS OF TRANSPORT

FIG. 9
(PRIOR ART)

REFORESTATION

ENERGY EFFICIENT PRODUCTION

RENEWABLE CLEAN ENERGY

ENERGY SAVING TEACHING

VEHICLE CO2 EMISSION OFFSETTING SYSTEM AND METHOD

FIELD OF THE INVENTION

The invention relates to a system and method of offsetting carbon dioxide ($CO_2$) emissions from a vehicle through credits, which neutralize the $CO_2$ released from the vehicle.

BACKGROUND

The automotive industry invests billions of dollars in new technologies, new power trains and new vehicle concepts to reduce vehicle fuel consumption, as well as greenhouse gas emissions. At the same time, worldwide lawmakers are legislating the development of new technologies or changing tax, penalty, and incentive systems to cut down on green house gas emissions and to develop new sources of revenue. Greenhouse gases undesirably absorb and emit radiation within the Earth's atmosphere, causing a "greenhouse effect". Attention to curb greenhouse gases has focused on carbon dioxide ($CO_2$), because $CO_2$ is created through ever-increasing combustion engines burning fossil fuels.

FIG. 1, as reported by the World Resources Institute, shows several climate change proposals introduced during the 110th United States Congress, between Jan. 3, 2007and Jan. 3, 2009. Each of the proposals introduced legislation to reduce the amount of greenhouse gases emitted in the United States, specifically CO2 emissions.

Because of forthcoming legislation coupled with high energy prices and demand, as well as increasing environmental awareness, many consumers are shifting their purchasing power to fuel-efficient vehicles, smaller vehicles, as well as vehicles with smaller engines. In fact, many consumers are foregoing personal transportation for public transportation. In order to survive or gain a larger market share, many automotive original equipment manufacturers (OEMs) are reorganizing their long-term goals. Many OEMs have become more conscience of the philosophy and social movement seeking to improve the environment. As a result, some OEMs are developing concept vehicles, such as Chevrolet's Volt, or fuel-saving technology, such as BMW's Efficient Dynamics found in the Mini.

Although the new products and technologies are an attempt by the OEMs to curb greenhouse gas emissions, expected substantial global growth within the automotive industry will maintain high or even increase greenhouse gas emissions. As reported by the Australian Government - Department of the Environment, FIG. 2 illustrates the amount of greenhouse gas emissions using different forms of transportation. Considering that a majority of people continue to use private transportation, the amount of greenhouse gas emissions will continue to increase. As reported by the United Nations, nearly 77% of the greenhouse gases, emitted into the atmosphere, were CO2 molecules, and nearly 9% of the CO2 came from vehicles (see FIG. 3;). Therefore, new approaches to curb greenhouse gas emissions are being proposed in addition to new technologies and products. Specifically, greenhouse gas compensation/offsetting programs are being developed and offered to promote renewable energies and energy efficient technologies. New companies and organizations, such as CARBONEUTRAL, ATMOSFAIR, and MYCLIMATE, are offering these programs, whereby they partner with different companies to offer customers the ability to offset CO2 emissions.

For instance, Volvo Swiss has partnered with Myclimate, whereby Volvo customers will have the opportunity to offset the annual $CO_2$ emissions of their vehicle, by buying a sticker developed by the company, the customer will be paying 50% to support a climate protection project in India and 50% to support a project in Switzerland. Volvo customers can purchase an "Annual CO2 Sticker". These stickers are available for three different fuel consumption categories. The revenue generated through the sale of the stickers will go to a climate protection project in India, as well as projects in Switzerland. The Volvo/Myclimate sticker is valid for one calendar year, and can be renewed annually. Since the sticker is attached to the inside of the windshield, the customer also has the ability to display the contribution to the selected program.

Many companies and customers are looking to become carbon neutral, or having a zero carbon footprint. This is achieved by balancing a measured amount of $CO_2$ released with an equivalent amount sequestered or offset.

More specifically, the $CO_2$ released by a vehicle may be balanced with use of renewable energy. Renewable energy creates a similar amount of useful energy that could be made using carbon based energy, so that the carbon emissions are compensated or offset. Alternatively, use of renewable energies generally does not produce $CO_2$. It is also possible to perform carbon offsetting, by paying others (companies) to remove or sequester 100% of the $CO_2$ emitted from the atmosphere. These companies receive money or sell credits, with proceeds used, for example, in planting trees or funding "carbon projects" that assist in prevention of future greenhouse gas emissions.

U.S. Pat. No. 7,343,341 discloses a method of facilitating the trade of emission allowances and offsets among participants, which includes establishing and emission reduction schedule for certain participants based on emission reduction schedule for certain participants based on emissions information provided by those participants and determining debits or credits for each certain participant in order to achieve the reduction schedule. A computer-based system, is disclosed, which includes means for establishing an emission reduction schedule for certain participants based on emissions information provided by those participants and means for determining debits or credits for each certain participant in order to achieve the reduction schedule. FIG. 4 shows an exemplary display of a graphical user interface of patent '341, illustrating of the level of participation required by the participant, including location, types of energy reporting units, activities etc.

The system includes (a) debits or credits representing emission reduction amounts based on the emissions information or activities of environmental benefactors, and (b) means for conducting trades of the debits or credits between the participants to enable each participant to achieve its reduction schedule.

The '341 patent further discusses methods for computing greenhouse gas emission or emission reduction equivalents including a participant providing activity data based on an energy consumption or conservation activity and associated with selectable activity units (see FIG. 5). The method discloses a converting of the activity data to one of greenhouse gas emission or greenhouse gas emission reduction equivalents in order to compute the greenhouse gas emissions or emission reduction equivalents. The equivalents conform to standard values that are then traded between participants. The factor can be based at least in part upon a location feature that is related to the geographic location of the energy activities and that is associated with selectable geographic locations. Activity data can be received from the participant, in which the activity data is based on an energy consumption or conservation activity and associated with selectable activity units. A factor for converting the activity data to one of greenhouse gas emission or greenhouse gas emission reduction equivalents can be applied, in which the factor is based on the type of energy activity and the selected activity unit to compute the greenhouse gas emissions or emission reduction equivalents to confirm whether the participant's information on amounts of greenhouse gas emission or emission reduction equivalents to be traded is accurate (see FIGS. 6 and 7).

Although the patent discuss a method to reduce or offset greenhouse gases, the method requires participants to provide the emissions information, and determines the debits or credits in order to achieve reduction schedules solely based on emissions information or activities of environmental benefactors provided by the participant. The patent only facilitates the trading of the debits or credits between the participants and is based on equivalents that conform to standard values, or estimates. The discussed system requires information and interaction by the participant, and lacks the ability to choose between packaged offsetting programs, professionally managed for the participant. Rather, the participant is required to trade debits and credits with other participants.

U.S. Pat. No. 6,382,014 discloses a mobile, on-board emissions testing system, as shown in FIG. 8, which is transferable between different vehicles, and provides for a real-time determination of mass flow rates of various gaseous pollutants based on the actual exhaust gas flow rate and which requires no modifications to the vehicle to be tested. The mobile vehicle, on-board testing system, includes a module designed to be detachably mounted on a vehicle to be tested and support means for detachably fixing the module to a body portion of the vehicle. A downstream gas analyzer detects concentrations of each of a plurality of gaseous pollutants within the exhaust gas, as sampled through the downstream sample tube. A computer serves as a calculating means for calculating mass flow rates for each of the gaseous pollutants based on the detected concentrations and the detected flow rate of the exhaust gas.

The computer-based emissions measurement system, discussed, is designed to be used on a moving vehicle, measuring the real-time mass emissions (grams) of plural gases, e.g. hydrocarbons (HC), carbon monoxide (CO), carbon dioxide ($CO_2$), oxygen ($O_2$), and nitrogen oxide (NO). Vehicle speed and distance traveled is also measured using a global positioning system (GPS) and/or by monitoring the speed signal sensed by the vehicle's on-board computer. The results of the mass measurements, the gas concentrations, exhaust gas flow rate, air/fuel ratio, fuel economy, etc., are all displayed and updated in real-time on the computer, as well as stored in a data file of the computer (see FIG. 9).

Although the '014 patent discloses an on-board computer-based emissions measurement system, the system is designed to monitor the emissions performance of vehicles on the road in order to meet exhaust gas emission standard. Therefore, the measurement is needed to identify gaseous emissions, fuel economy, engine, and vehicle operating parameters.

Ideally, an emission calculation system coupled with a way of offsetting those measured emissions is needed.

SUMMARY

Accordingly, the present invention was devised in light of the problems described above, the invention relates to a method of offsetting carbon dioxide ($CO_2$) emissions by selecting a customized $CO_2$ offsetting package to offset measured or calculated vehicle emissions, the vehicle emissions being neutralized and exhibited through a visual indicator positioned inside or outside the vehicle.

In particular, the invention relates to a method of offsetting carbon dioxide ($CO_2$) emissions by capturing $CO_2$ emissions data from a vehicle, transmitting the emissions data to a data collection unit, which then stores collected $CO_2$ data and calculates a $CO_2$ emission report. The $CO_2$ emission report is used in preparing a customized $CO_2$ offsetting package, which is offered to and selected by the vehicle owner. The customized $CO_2$ offsetting package is capable of offsetting the $CO_2$ emissions through credits, which neutralize the $CO_2$ released from the vehicle. The owner of the package may be granted a visual indicator exhibiting that the vehicle is currently carbon neutral, while receiving status on the progress of the offsetting project.

Additionally, the invention relates to a $CO_2$ emissions offsetting system, having a vehicle emissions measuring device that captures $CO_2$ emissions data, which is sent to a data collection unit through a transmission device, the data collection unit having databases to store sent $CO_2$ emissions data, which is used to prepare a $CO_2$ emission report. The $CO_2$ emission report is used to customize a variety of $CO_2$ offsetting programs offered to the vehicle owner, the selected $CO_2$ offsetting program used to offset any of the measured vehicle $CO_2$ emissions through purchased credits.

BRIEF DESCRIPTION OF THE DRAWINGS

The invention will be explained in greater detail with reference to embodiments, referring to the appended drawings, in which:

Figure 9:
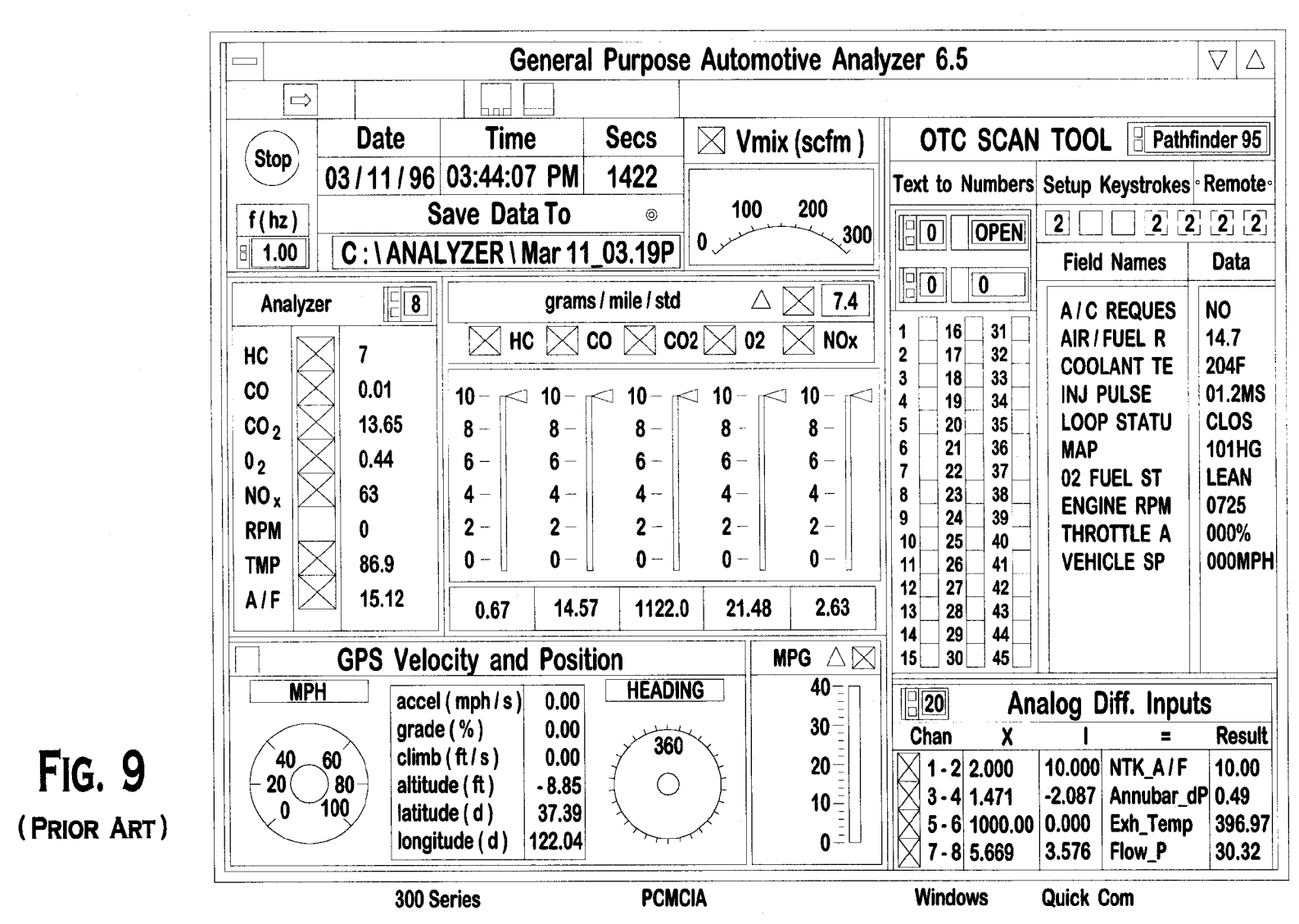

FIG. 9 is a depiction of a known display screen providing a graphical user interface with measured emissions;

DETAILED DESCRIPTION OF THE EMBODIMENT(S)

The invention will now be described in greater detail first with reference to FIGS. 10 through 15.

The present invention relates to a method of offsetting carbon dioxide ($CO_2$) emissions by selecting a customized $CO_2$ offsetting package, provided and managed by a central provider, to offset measured vehicle emissions. The measured vehicle emissions being neutralized by purchased credits received through the selected $CO_2$ offsetting packed, with the neutrality being exhibited through a visual indicator or optical indicator positioned inside or outside of the vehicle.

Figure 1:
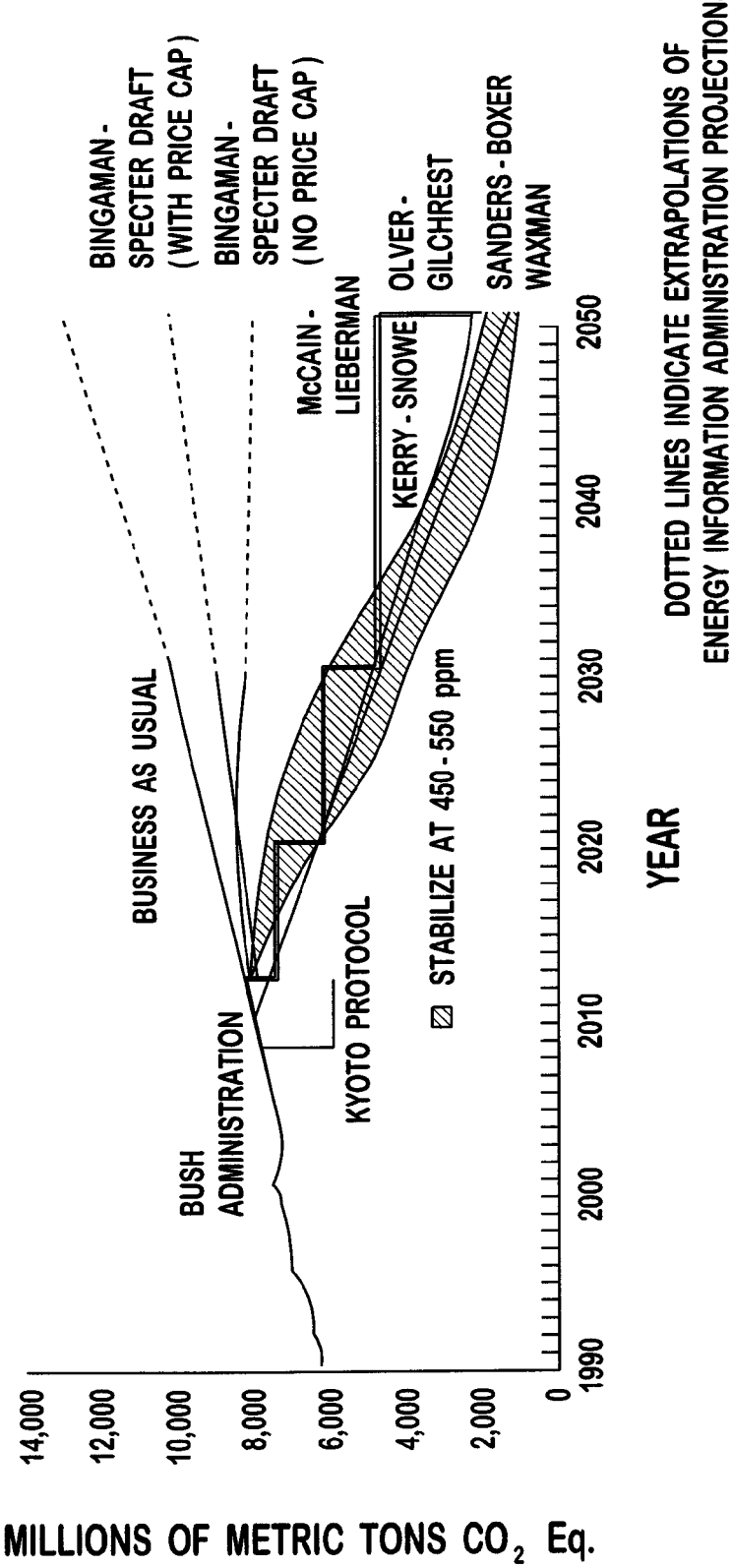
FIG. 1 is graphical representation comparing proposed legislation to curb CO2.
Figure 2:
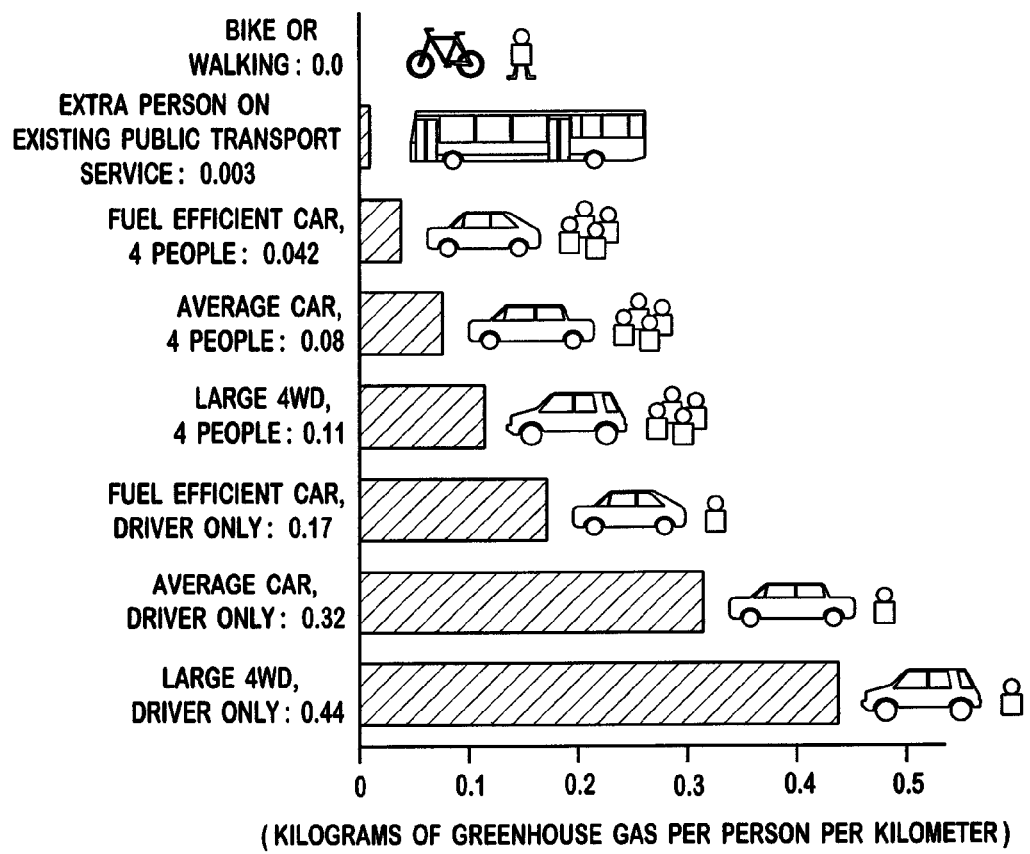
FIG. 2 is a graphical representation comparing greenhouse gas emissions with different forms of transportation.
Figure 3:
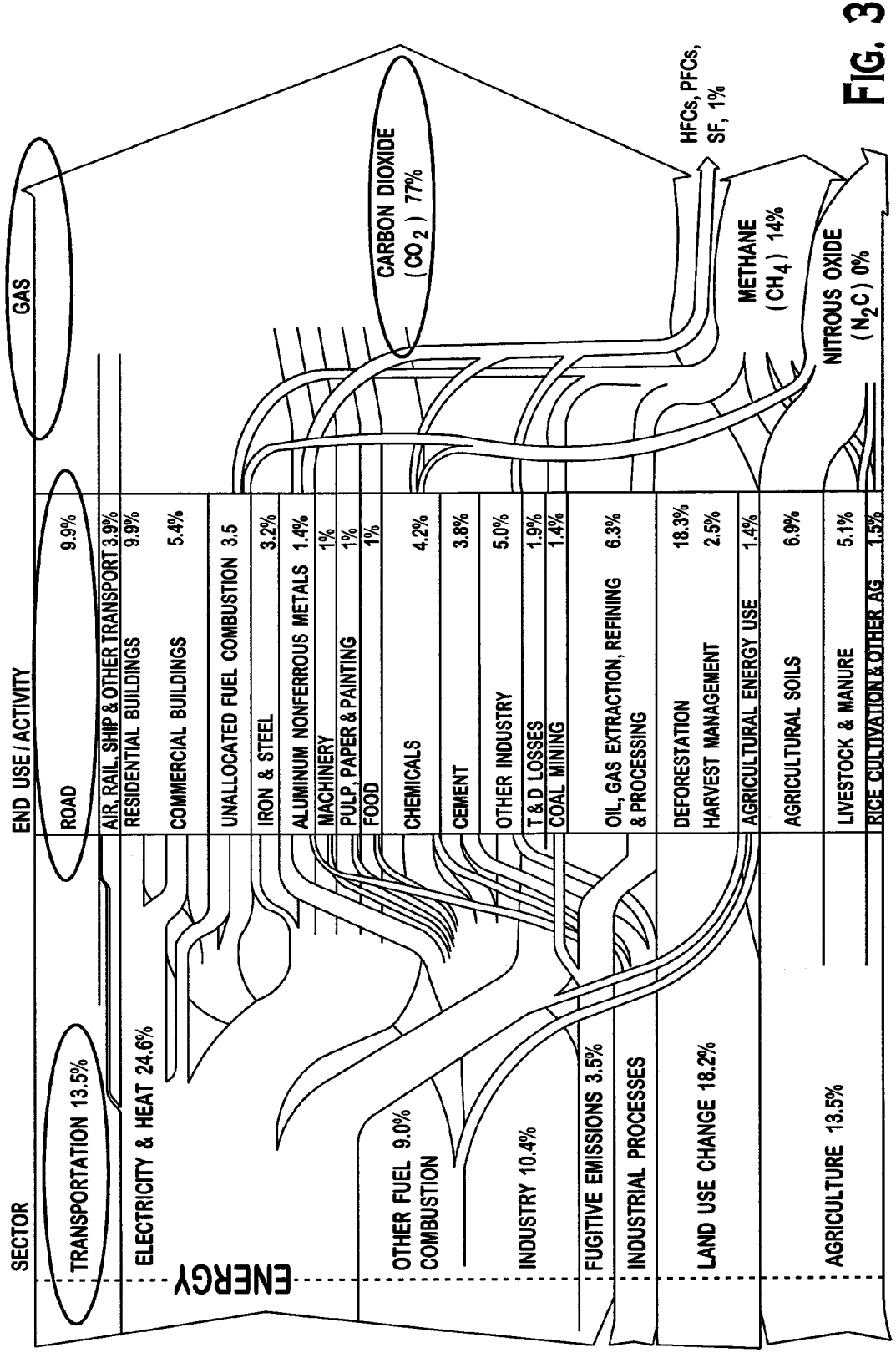
FIG. 3 is a diagram representing the breakdown of greenhouse gas emission by sector and end use/activity.
Figure 4:
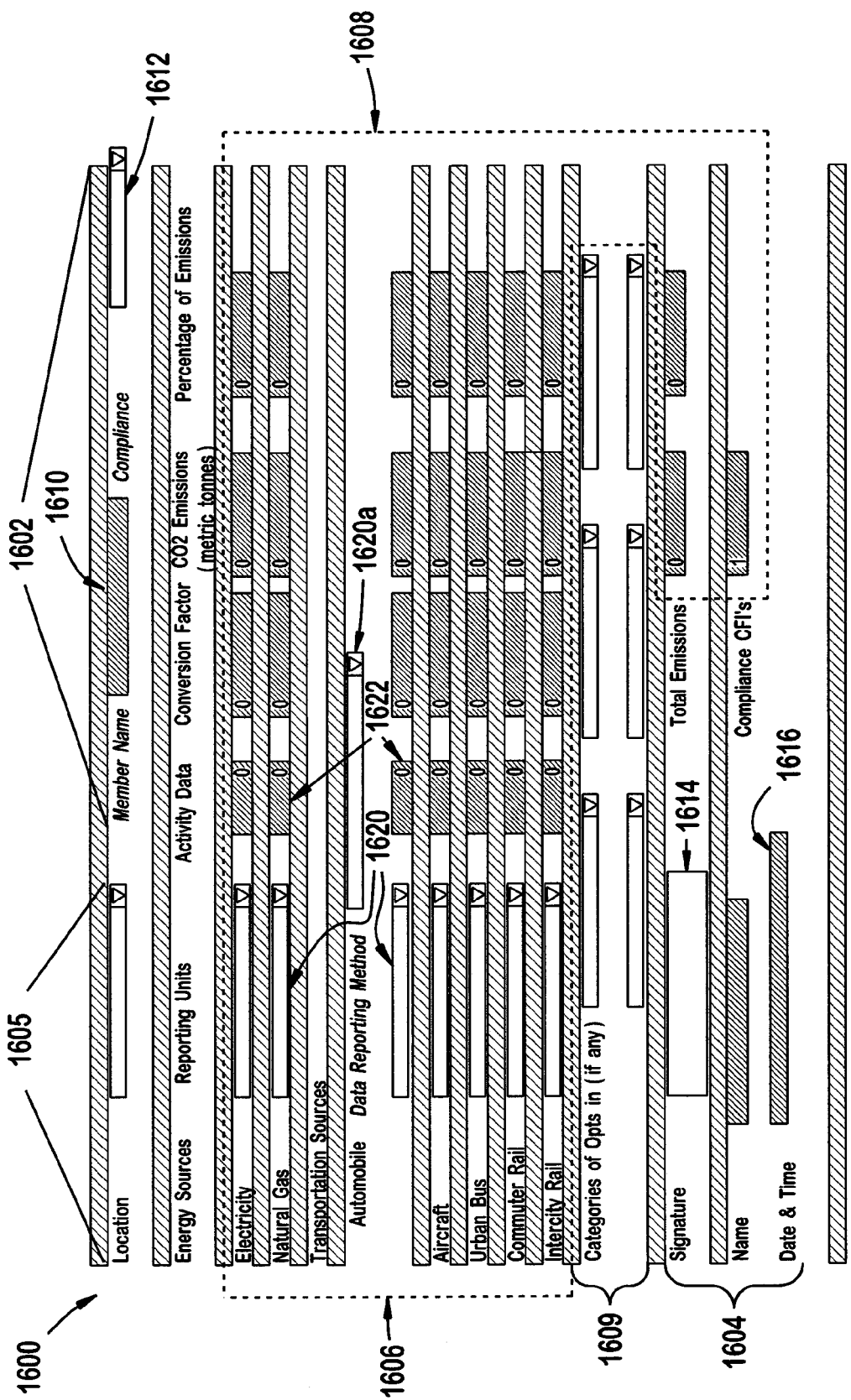
FIG. 4 is a known display of a graphical user interface that facilitates computations of greenhouse gas emissions and compliance holdings.
Figure 5:
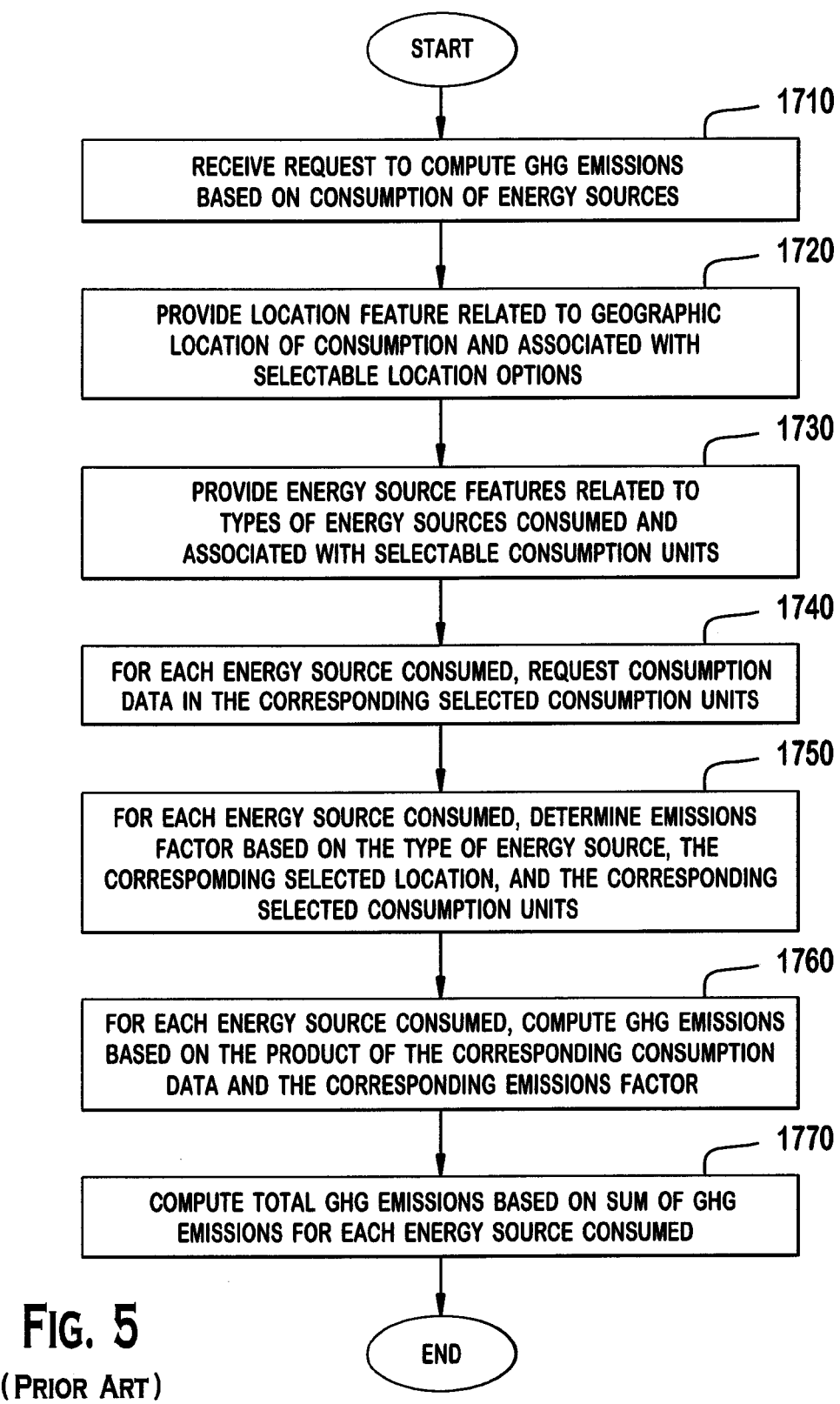
FIG. 5 illustrates a known method for computing greenhouse gas emissions using information provided by a participant in the graphical user interface of FIG. 4.
Figure 6:
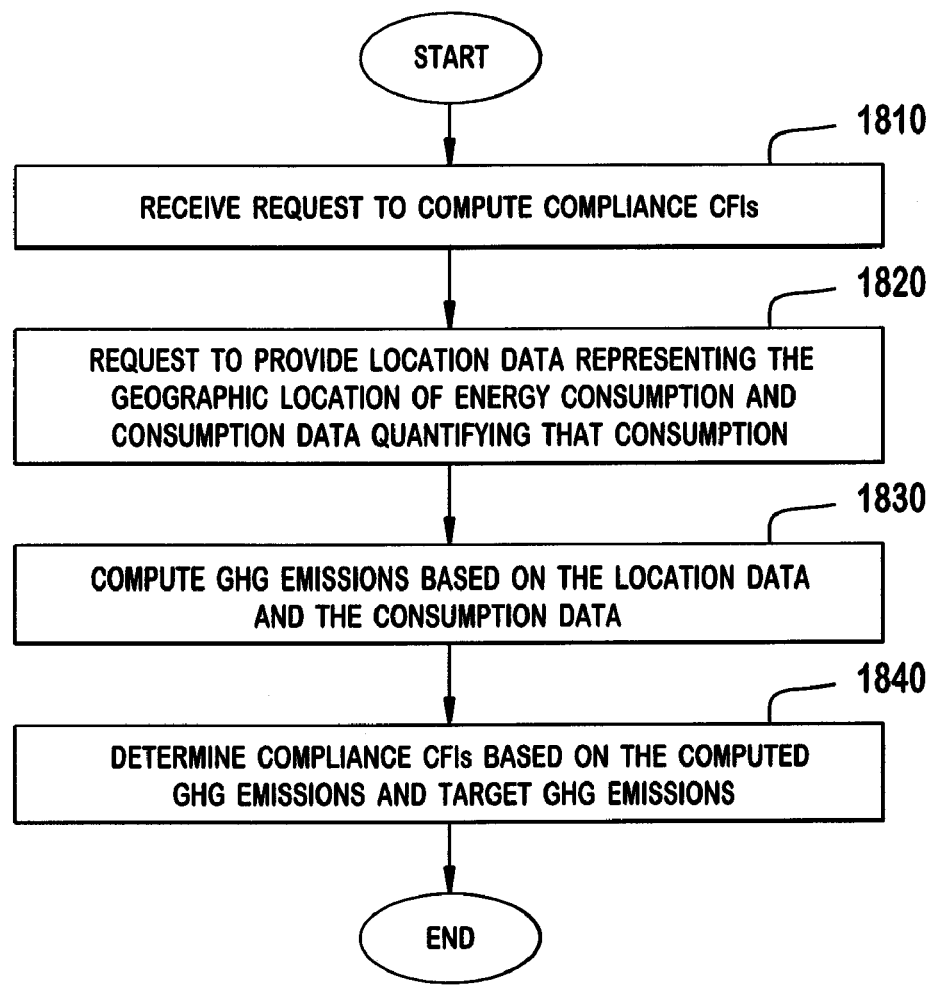
FIG. 6 illustrates a known method for computing compliance holdings from information provided by a participant in the graphical user interface of FIG. 4.
Figure 7:
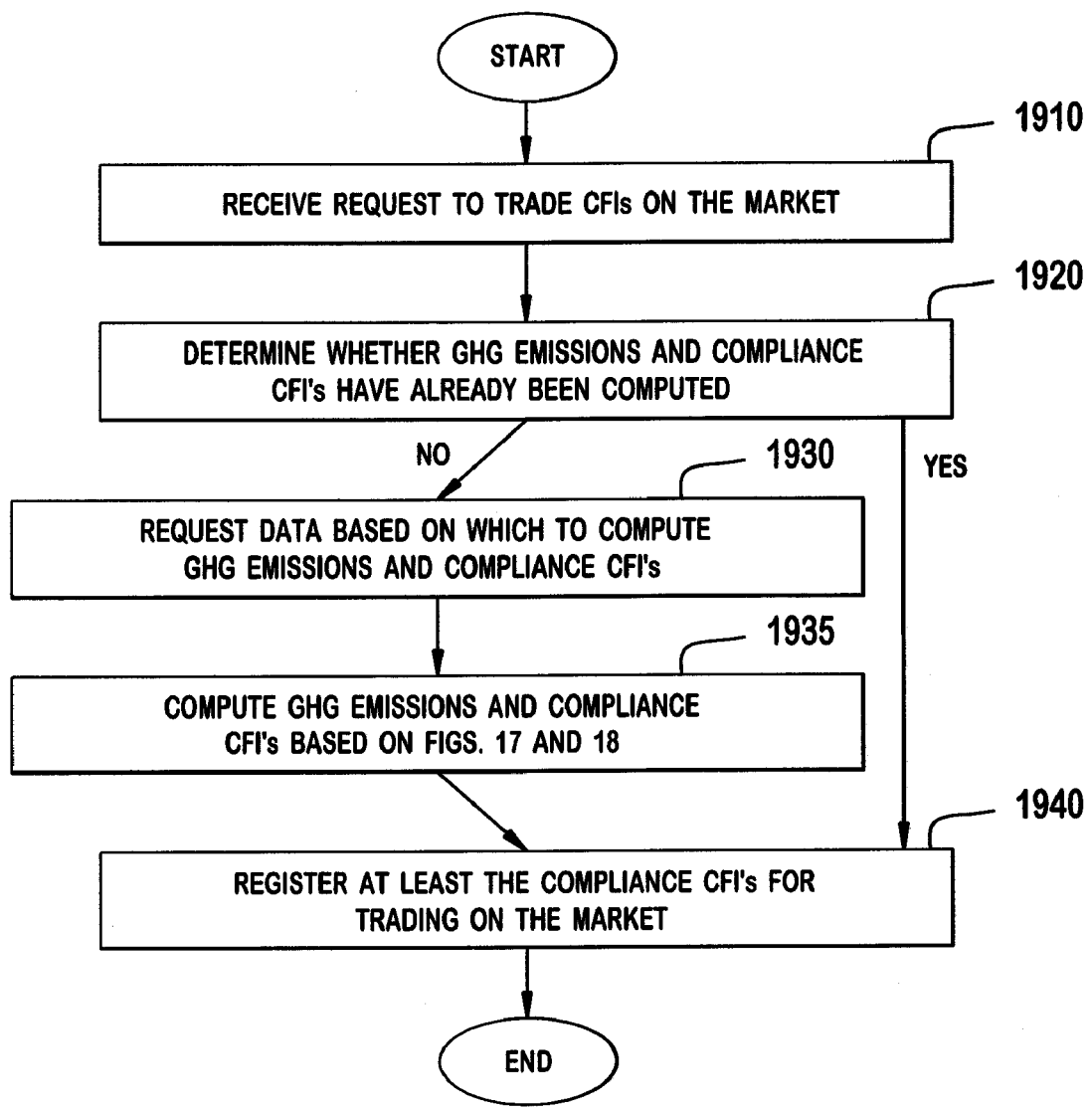
FIG. 7 illustrates a known method for registering holdings for trading on a market supported by the system discussed in U.S. Pat. No. 7,343,341.
Figure 8:
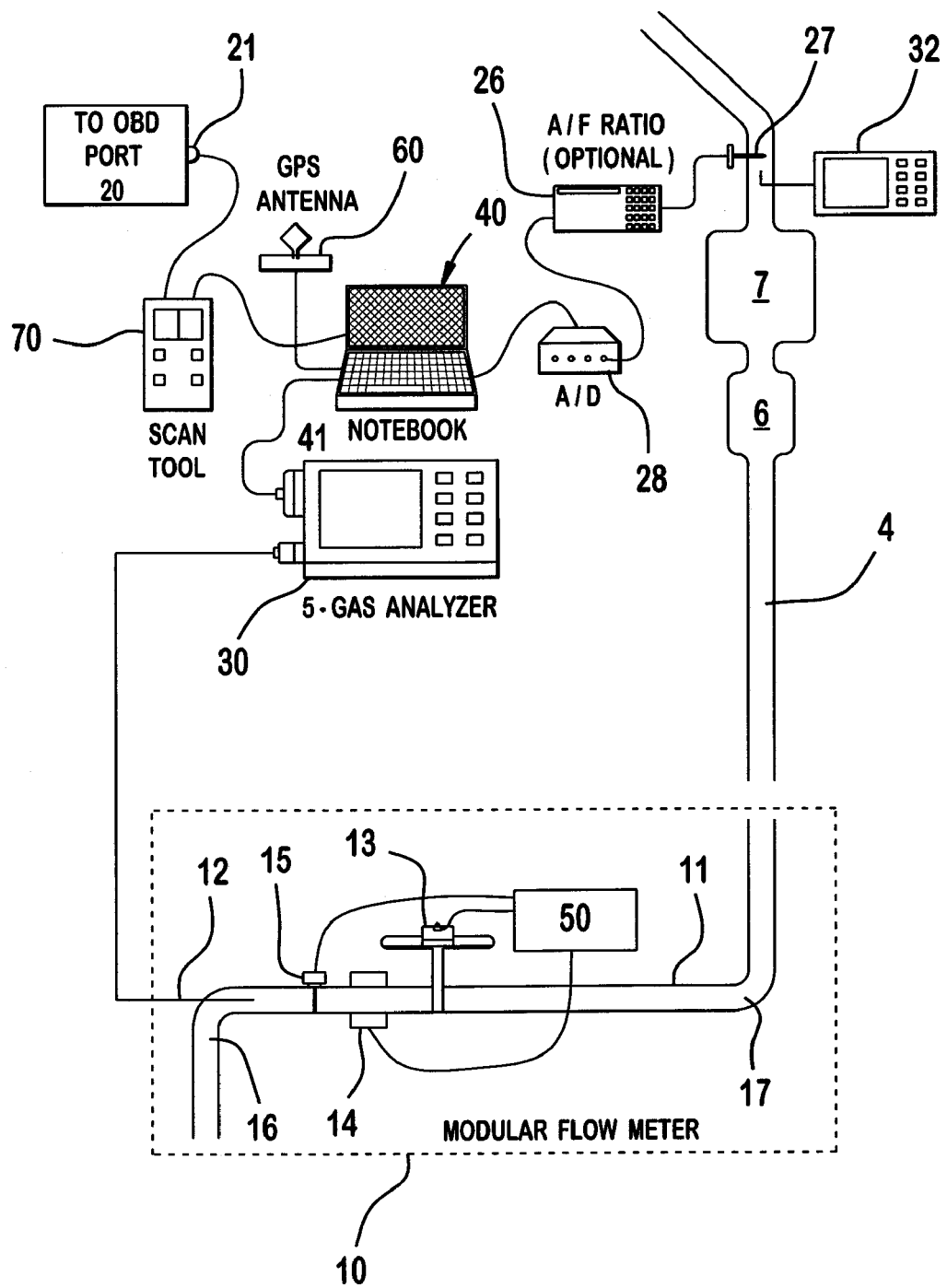
FIG. 8 is a schematic view of a known emissions reporting system.
Figure 10:
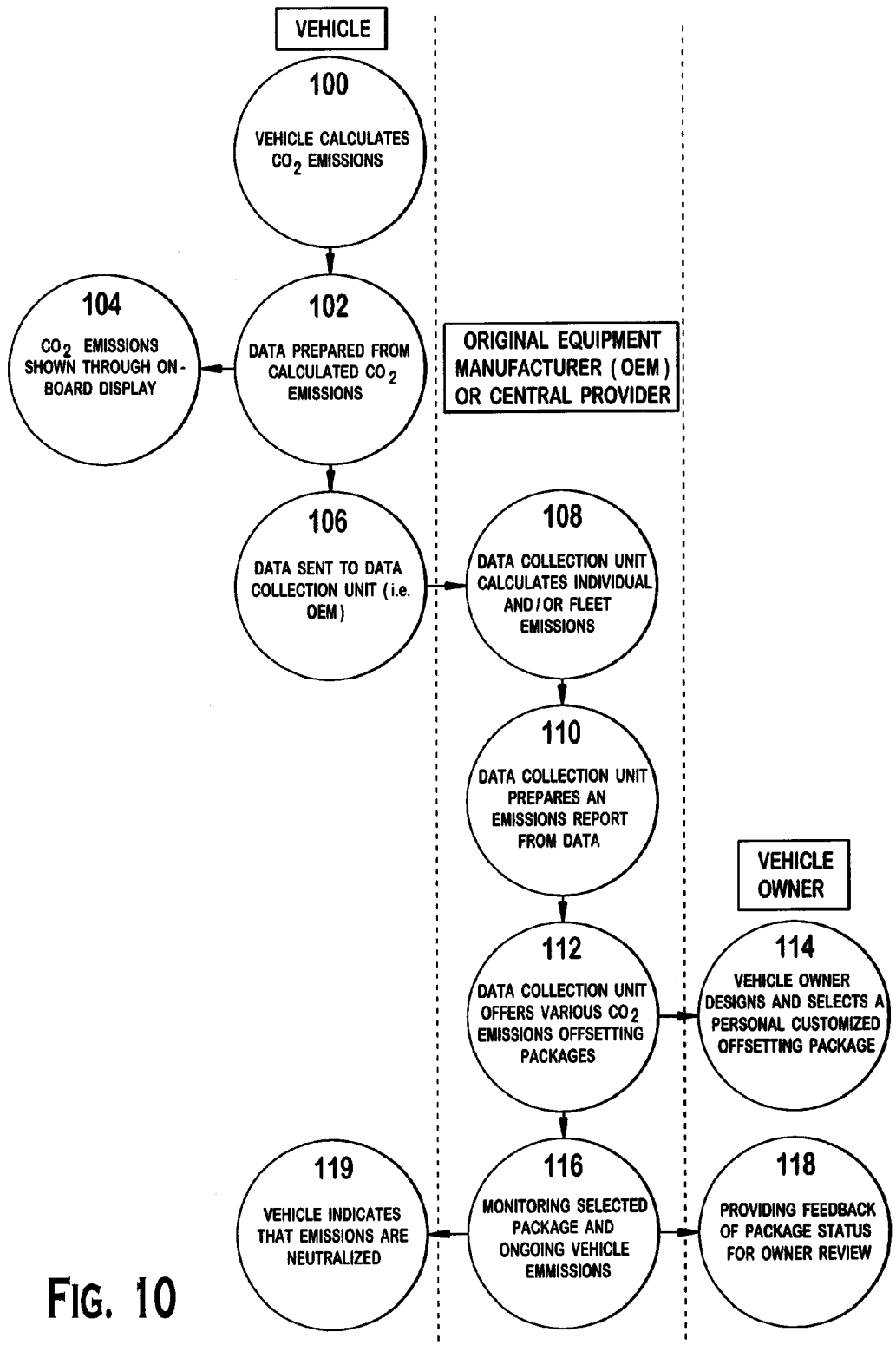
FIG. 10 illustrates a method of offsetting measured CO2 emissions of the present invention.
Figure 11:
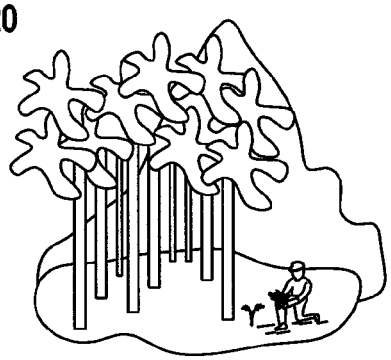
FIG. 11 illustrates a variety of ways that a selectable customized offsetting package can neutralize measured vehicle CO2.
Figure 11:
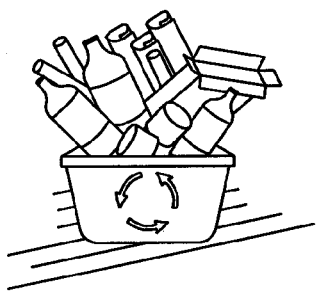
Figure 11:
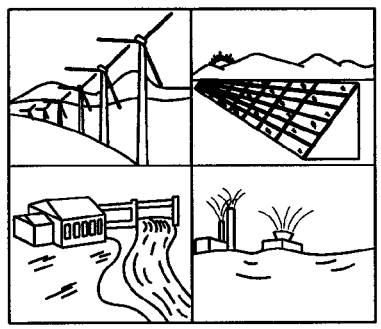
Figure 11:

With reference to FIG. 10, the vehicle captures $CO_2$ emissions data 100. The vehicle emissions data represents the amount of $CO_2$ produced by the vehicle over a particular period of time. The way the emissions data is captured can be performed by a variety of methods, including but not limited to an on-board calculation module, an odometer reading, or a vehicle service center reading real time data capture systems or any other suitable method. Each of these instruments operate as a primary vehicle emissions measuring device, which will be discussed in further detail, below.

Figure 16:
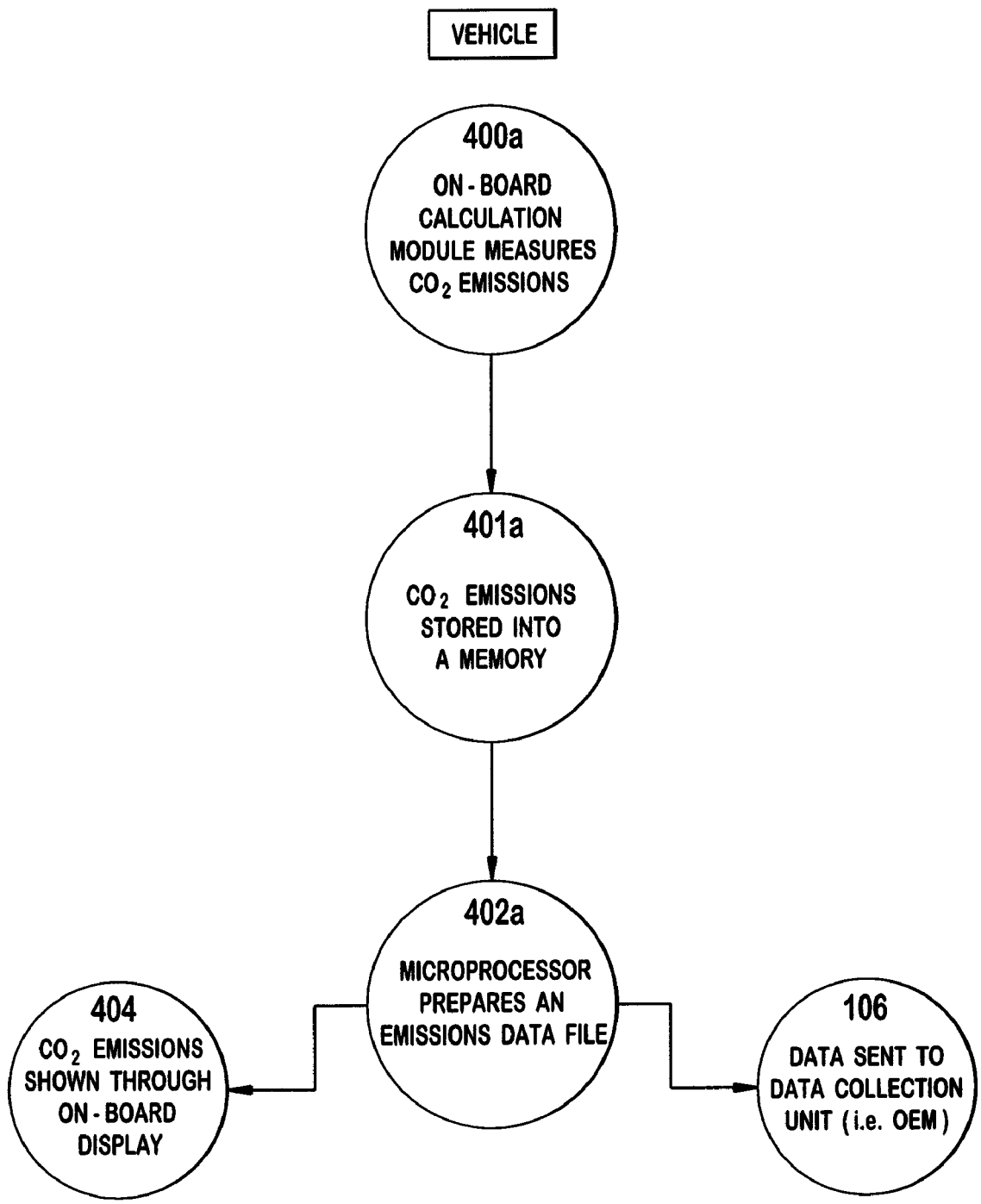
FIG. 16 illustrates a method of calculating $CO_2$ emissions

Referring now to FIG. 16, the vehicle $CO_2$ emissions are calculated using the on-board calculation module 400*a*, which measures the amount of $CO_2$ emissions produced by the vehicle in real-time. This information is stored into a memory 401*a*, where a microprocessor prepares a data file 402*a* that includes the amount of $CO_2$ emissions over a period of time. Additionally, in other embodiments, the calculation module might also be located in mobile CE device where data is sent via USB, Bluetooth, or WLAN from the vehicle to the mobile CE device.

Figure 17:
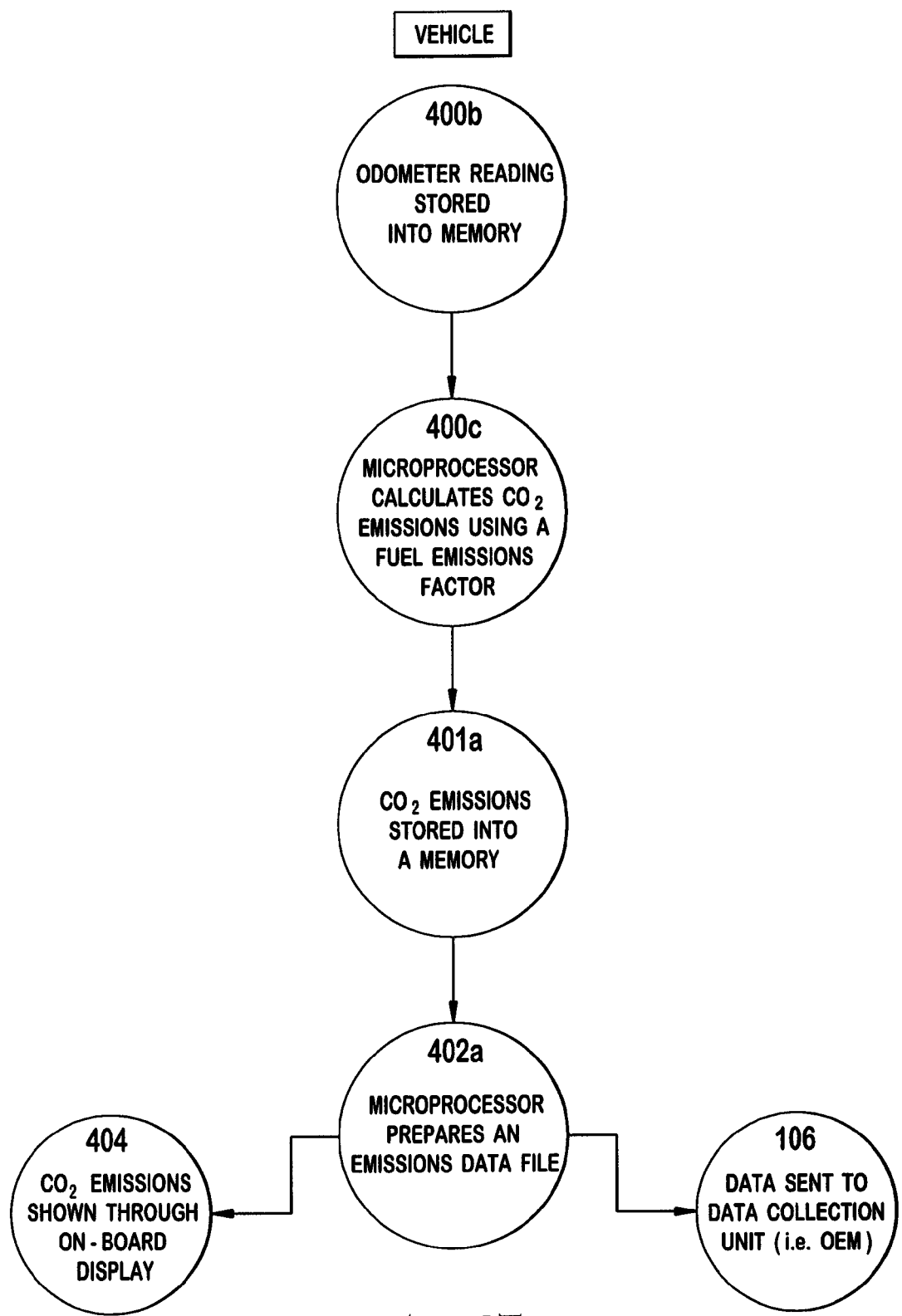
FIG. 17 illustrates another method of calculating $CO_2$ emissions.
Figure 18:
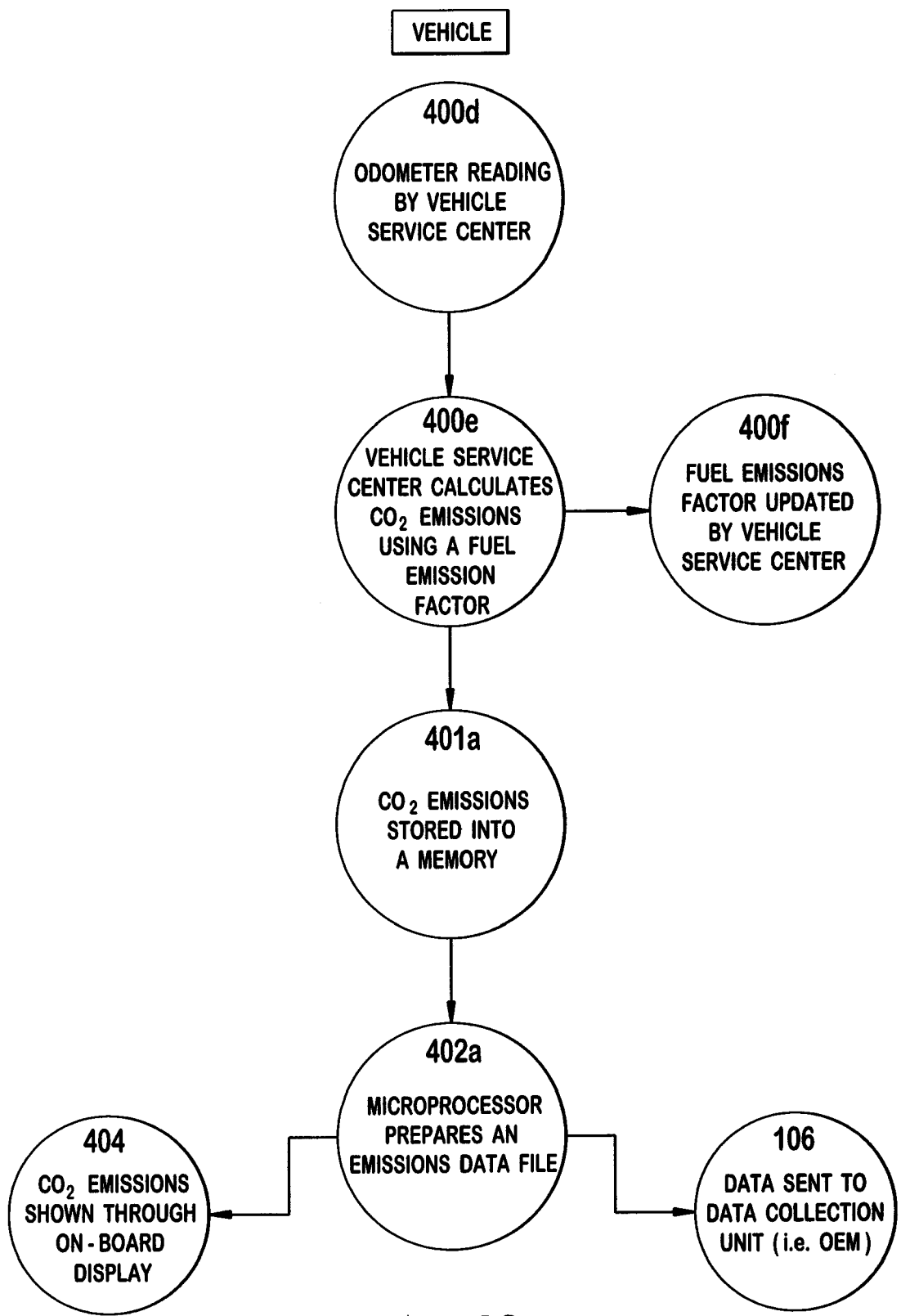
FIG. 18 illustrates another method of calculating $CO_2$ emissions.

Now referring to FIGS. 16-18, the amount of $CO_2$ emissions are not actual but estimated or gauged. For instance, in FIG. 17, the amount of $CO_2$ emissions are determined using an odometer reading. The odometer reading is recorded into the memory 400*b*, and the microprocessor calculates the amount of $CO_2$ emissions using a fuel emissions factor 400*c*. The fuel emissions factor is a $CO_2$ quantity of kilograms per kilometer the vehicle produces during operation. This factor is measured by an original equipment manufacturer (OEM) after manufacturing and fixed into the memory pre-sale. Accordingly, this factor can be multiplied by the current odometer reading to prepare an estimate of vehicle $CO_2$ emissions over a period of time. This fuel emissions factor can also be updated by a vehicle service center at anytime, as well. In FIG. 18, the vehicle service center takes the actual odometer reading 400*d* and prepares an emission calculation 400*e* using the fuel emissions factor that he gauges during service 400*f*.

Additionally, using previous odometer readings, an estimated amount of $CO_2$ emissions may be determined using previous odometer readings. For instance, a future odometer reading may be estimated by looking at the previous incremental readings, and an extrapolated odometer reading can be estimated. The fuel emissions factor can be multiplied by this estimated odometer reading to prepare an estimate of vehicle $CO_2$ emissions over a period of time. Again, the fuel emissions factor can also be updated by a vehicle service center at anytime, as well. Furthermore, the fuel emissions factor along with other resp. vehicle specifications, such as engine type, fuel type, etc. may be entered into an internet portal or application by the vehicle owner, with the internet portal or application determining an estimated amount of $CO_2$ emissions.

Since vehicles are not only purchased and owned by individuals, vehicle $CO_2$ emissions readings may also be calculated across a fleet of vehicles.

As briefly discussed above, and referring back to FIG. 10, the calculated $CO_2$ emissions is then prepared into data format 102, in order to transmit the data. The data may be prepared with other readings, such as gas consumption, mileage and electricity used. The captured $CO_2$ emissions data may be displayed through an on-board display 104, where the vehicle user can view the quantified measurement of $CO_2$ emissions emitted into the atmosphere of the vehicle. As will be discussed below, the on-board display is a graphical user interface device enabling the user to review a variety of information concerning the vehicle $CO_2$ emissions. Additionally, the prepared data is now in a form, such that the data may be sent to a data collection unit 106.

The measured $CO_2$ emissions data is sent to the data collection unit, which may be the original equipment manufacturer (OEM) or central provider, who may have partnered with the original equipment manufacturer (OEM). In one embodiment, the data is being sent using an automotive telematics infrastructure, performing a wireless data communication between the vehicle and the data collection unit. However, it is also possible that the vehicle owner provide $CO_2$ emissions data the data collection unit, using a computer link, such as web based computer interface. Additionally, it is conceivable that the $CO_2$ emissions data may be prepared and sent to the data collection unit by the vehicle service center who has gathered the appropriate information needed to keep track of the vehicles $CO_2$ emissions over a period of time. Additionally, it is also possible transmit the data using a USB device and a USB port positioned in the vehicle. The data can then be transferred to a to home PC or mobile device using the USB device; then the data is transmitted to the central collection unit from home PC or mobile device.

Next, the data collection unit registers and stores of incoming emissions data, based on individual or fleet ownership 108. Databases are created, which identify and catalog vehicle $CO_2$ emissions over a period of time. These databases are then used to prepare an initial emissions report for the vehicle owner (which could be a fleet owner). This emissions report would quantify the $CO_2$ emissions measured during the time the owner has operated the vehicle, as well as a variety of $CO_2$ offsetting options, packaged to offset past, present and future $CO_2$ emissions. In addition to the quantified measurements and packages, the report may include information about climate change and how each $CO_2$ offsetting package would neutralize the vehicles' carbon footprint.

In one embodiment, the emissions report would detail the actual $CO_2$ emissions produced by the vehicle's operation, and how those measurements were calculated. In the form of a $CO_2$ balance sheet, the report would indicate gas consumption, gas mileage, and other readings sent along with the $CO_2$ emissions data. Although the first report would be used to introduce the vehicle owner to $CO_2$ offsetting packages, these reports could be prepared and distributed to the vehicle owner on a periodic basis. Each report could be prepared to a individual vehicle owner or owner of a fleet of vehicles. Therefore, the report would help identify disparity of $CO_2$ emissions between fleet vehicles.

The data collection unit may send the report using a variety of means, including a postal service or any suitable electronic transmission. It is conceivable that vehicle owner could select the means of transmission of the initial report, and any other subsequent reports.

Within the emissions report are the variety of $CO_2$ offsetting packages 112 that the original equipment manufacturer (OEM), central provider, or joint venture are offering to offset $CO_2$ emissions being produced by the vehicle.

As discussed above, in the background, a carbon offset is a financial instrument representing a reduction in greenhouse gas emissions. $CO_2$ emission offsetting is typically generated from emissions-reducing projects. The most common project types are renewable energies, such as wind farms, biomass energy, or hydroelectric dams. However, other common project types which include energy efficiency projects, the destruction of industrial pollutants or agricultural byproducts, destruction of landfill methane, and reforestation projects are commonly used as well (See FIG. 11).

Since the $CO_2$ offsetting packages require the purchase of credits, the vehicle owner would select $CO_2$ offsetting package that is economically appropriate. The vehicle owner could purchase a package that only offsets the $CO_2$ emissions already produced and measured, or the vehicle owner may purchase a package that offsets future production as well. It is also possible that package prices would be included in the manufacturers suggested retail price of the vehicle (MSRP) or as an added feature to the purchase of the vehicle. In addition, it is also possible that the original equipment manufacturer (OEM) would purchase the package, or that local governments would provide incentives for package purchases.

The offered $CO_2$ offsetting packages would be fully customizable. Therefore, the vehicle owner designs and selects a personal customized $CO_2$ offsetting package 114 (see FIG. 10). The $CO_2$ offsetting package is monitored 116 by the original equipment manufacturer (OEM), central provider, or joint venture in regard to any incoming emissions data. This enables the original equipment manufacturer (OEM), central provider, or joint venture to provide feedback on the status of the $CO_2$ offsetting package 118, including used and unused credits, as well as what offsets have been performed as a result of the purchase.

Feedback and package status may be provided to the vehicle owner using ongoing emissions reports, or through a separate report. This may be done on a regular periodic basis, when credits run-out, or when credits fall below a pre-determined limit, which may be customized by vehicle and package owner. It is also possible that the vehicle and package owner may access instantaneous feedback through a secure web interface.

Once the vehicle owner has selected an appropriate $CO_2$ offsetting package, and the original equipment manufacturer (OEM), central provider, or joint venture has deemed the vehicle as carbon neutral, the vehicle owner will be provided with an indicator, designating the vehicle as carbon neutral 119.

Each $CO_2$ offsetting package is customized to offset a specified amount of measured or calculated $CO_2$. Therefore, the selection process discussed above may be repeated once the $CO_2$ offsetting package is fully exhausted.

In the present invention, the indicator, designating that the $CO_2$ emissions have been neutralized, is a visual indicator. The visual indicator, which will be discussed in further below, may be displayed in such a way that others may view the vehicle as a carbon neutral. Additionally, it is possible that the vehicle owner is provided with a physical certificate that designates that the $CO_2$ emissions have been neutralized. The certificate may be a paper certificate, electronic certificate or a sticker.

Now, a $CO_2$ emissions offsetting system will be discussed, with reference FIGS. 12-15. The $CO_2$ emissions offsetting system is used to carry out the method of offsetting $CO_2$ emissions detailed in the present invention.

Figure 12:
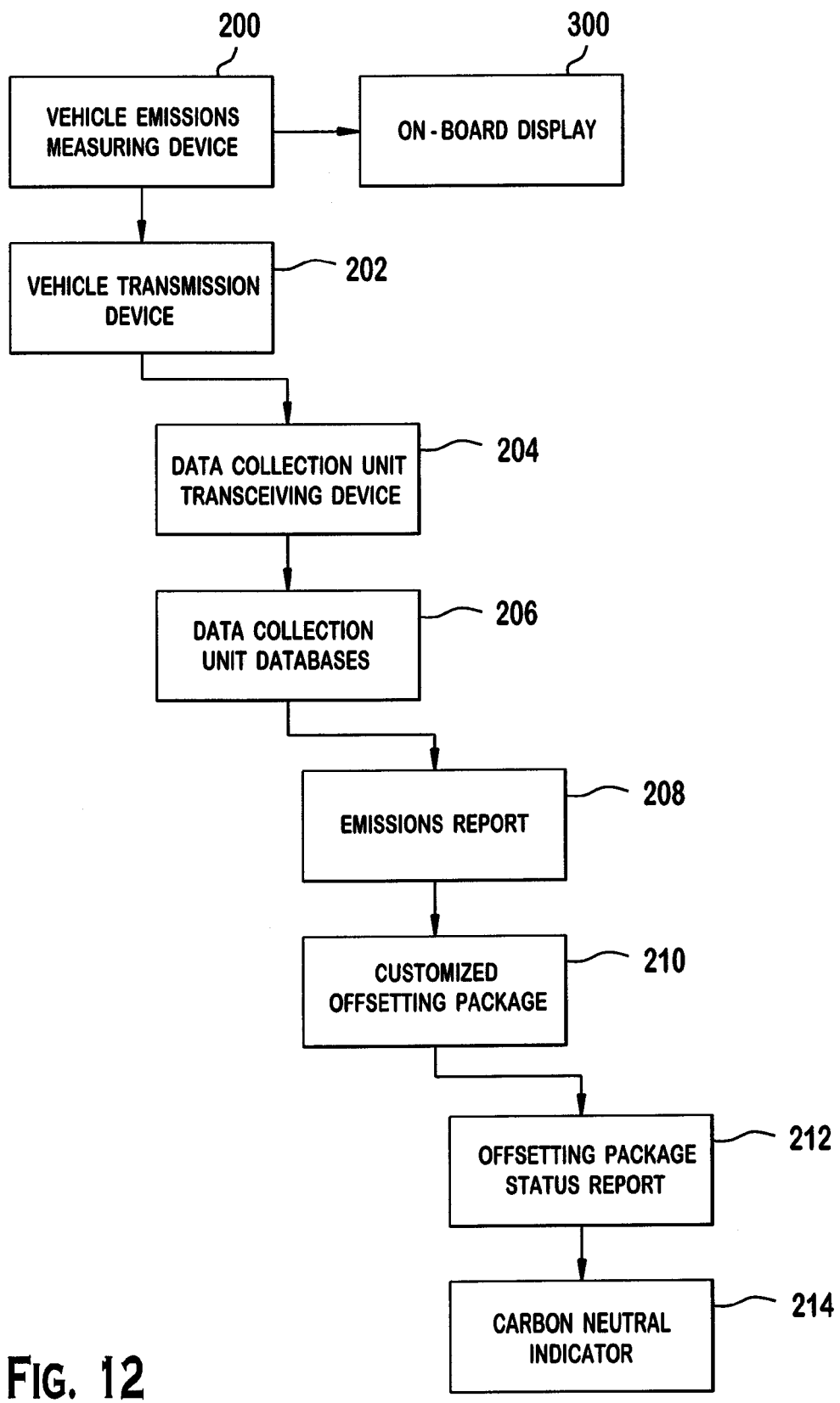
FIG. 12 illustrates a CO2 emissions offsetting system of the present invention.

First, and with reference to FIG. 12, the $CO_2$ emissions offsetting system includes a vehicle emissions measuring device 200 for capturing the $CO_2$ emissions data. As discussed above, the $CO_2$ emissions data may be captured through a variety of instruments, including but not limited to, the on-board calculation module or the vehicle odometer.

Figure 13:
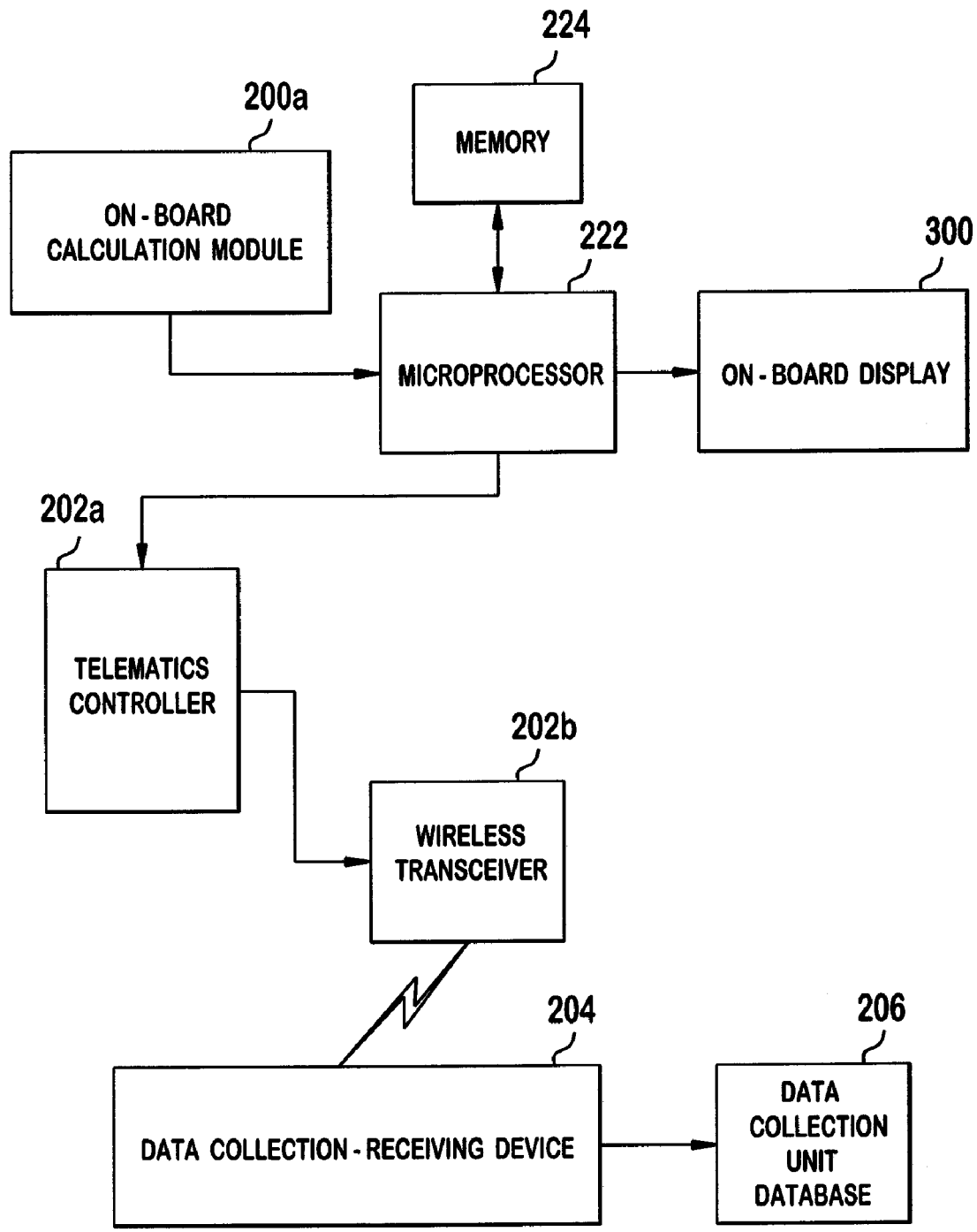
FIG. 13 represents a depiction of an on-board display of measured CO2 emissions.

In one embodiment of the invention, the vehicle measuring device 200 is the on-board calculation module 200a, as shown in FIG. 13. The on-board calculation 200a module measures actual $CO_2$ emissions being generated by the operating vehicle. As a result, the on-board calculation module 200a can provide real-time results of the vehicles contribution to a carbon footprint. The information is constantly being stored into a memory 224 through a microprocessor 222, which takes the $CO_2$ information, as well as other collected information, and prepares a data file. The memory 224 or any other similar storage device can be integrated in the vehicle, on a mobile CE device, or in the backend infrastructure.

As discussed above, an odometer reading is also sufficient in determining the amount of $CO_2$ emissions. The odometer reading is recorded into the memory, and the microprocessor calculates the amount of $CO_2$ emissions using a fuel emissions factor. The fuel emissions factor is a $CO_2$ quantity of kilograms per kilometer the vehicle produces during operation. This factor is measured by an original equipment manufacturer (OEM) after manufacturing and fixed into the memory pre-sale. Accordingly, this factor can be multiplied by the current odometer reading to prepare an estimate of vehicle $CO_2$ emissions over a period of time. This fuel emissions factor can also be updated by a vehicle service center at anytime, as well. Again, the vehicle service center may also take an actual odometer reading during service, and prepares a calculation using the fuel emissions factor that he gauges during service. A vehicle service center calculation module may be used to gather emissions information, and prepare a data file consisting of information collected.

Regardless of the instruments used, the vehicle emissions measuring device 200, as shown in FIG. 12, is one that measures the amount of $CO_2$ being produced by the operating vehicle. The vehicle emissions measuring device 200 quantifies that measurement, and prepares a data file. A on-board display 300 may be used to display information from that prepared data file, providing the vehicle owner or driver with an on-board display of information relating to the vehicle's carbon footprint, as well as other information collected within the data file. The data may be prepared with other readings, such as gas consumption, mileage and electricity used.

In addition, the vehicle emissions measuring device 200 links to transmission device 202. Additionally, the prepared data is now in a form, such that the data may be sent to a data collection unit 106.

The measured $CO_2$ emissions data is sent to the data collection unit, which may be the original equipment manufacturer (OEM), central provider, or joint venture. A transmission device 202 is required to do this. In one embodiment of the invention, an automotive telematics infrastructure is used. The automotive telematics infrastructure provides wireless data communication service between the vehicle and the data collection unit.

As shown in FIG. 13, the automotive telematics infrastructure includes a telematics controller 202a and a wireless transceiver 202b. However, it is possible to have additional modules that facilitate efficient transmission of emissions data to the data collection unit. The wireless transceiver 202b having the ability to send and receive data between the data collection unit.

In other embodiments, the transmission device 202, a computer link, whereby it is possible for the vehicle owner to provide $CO_2$ emissions data to the data collection unit, using a web based computer interface. If a mobile CE device is used to store $CO_2$ emissions data, then the device would also be capable of sending $CO_2$ emissions data to the central collection unit.

Additionally, emissions data is sent from the vehicle service center, who has gathered the appropriate information needed to keep track of the vehicles $CO_2$ emissions over a period of time. The vehicle service center having the ability to link to the data collection unit, using a transmission device 202.

The data collection unit has a reciprocal transceiver, a data collection-receiving device 204. The data collection-receiving device 204 receives data from the vehicle transmission device 202, while also capable of sending information back to the vehicle transmission device 202. The data collection unit registers the incoming data, storing common data in data collection unit databases 206. These databases 206 are structured collections of records, which identify and catalog vehicle $CO_2$ emissions over a period of time.

These databases 206 are then used to prepare an initial emissions report 208 for the vehicle owner (which could be a fleet owner). This emissions report 208 quantifies the $CO_2$ emissions measured during the time the owner has operated the vehicle, as well as a variety of $CO_2$ offsetting options 210, packaged to offset past, present and future $CO_2$ emissions. In addition to the quantified measurements and packages 210, the report 208 may include information about climate change and how each $CO_2$ offsetting package 210 would neutralize the vehicles' carbon footprint.

In one embodiment, the emissions report 208 would detail the actual $CO_2$ emissions produced by the vehicle's operation, and how those measurements were calculated. In the form of a $CO_2$ balance sheet, the report would indicate gas consumption, gas mileage, and other information sent along with the $CO_2$ emissions data, by the transmission device 202 to the data collection unit. Although the first report would be used to introduce the vehicle owner to $CO_2$ offsetting packages 210, these reports 208 could be prepared and distributed to the vehicle owner on a periodic basis. Each report 208 could be prepared for an individual vehicle owner or owner of a fleet of vehicles. Therefore, the report 208 would help identify disparity of $CO_2$ emissions between fleet vehicles.

The report 208 maybe a packaged paper one or an electronic document. It is conceivable that vehicle owner may prefer the type of report 208, and any other subsequent reports 208. Additionally, the report 208 could also be sent to the vehicle, a mobile CE device or even home PC, as well.

Within the emissions report are a variety of $CO_2$ offsetting packages 210 that offer the vehicle owner an option to offset $CO_2$ emissions being produced by the operating vehicle. It is possible to view the report 208 through the web using a home PC or mobile device (through the web), therefore, the vehicle owner may configure and choose offsetting project through the same.

A selected $CO_2$ offsetting packages 210, maybe customized by the vehicle owner, and is essentially a financial instrument representing a reduction in greenhouse gas emissions. $CO_2$ emission offsetting is typically generated from emissions-reducing projects. The most common project types are renewable energies, such as wind farms, biomass energy, or hydroelectric dams. However, other common project types which include energy efficiency projects, the destruction of industrial pollutants or agricultural byproducts, destruction of landfill methane, and reforestation projects are commonly used as well.

Selecting a customized $CO_2$ offsetting package 210 requires the purchase of credits. Therefore, the $CO_2$ offsetting package 210 may be customized to accommodate with the vehicle owner's economic and utility preferences. In essence, the $CO_2$ offsetting package 210 could be prepared to only offset already produced $CO_2$ emissions, or prepared to offset present and future production as well. It is also possible that the $CO_2$ offsetting package 210 would be included in the manufacturers suggested retail price of the vehicle (MSRP) or as an added feature to the purchase of the vehicle. Any differences in the original $CO_2$ offsetting package 210 and future CO2 emissions could then be supplemented with additional $CO_2$ offsetting packages 210. In addition, it is also possible that $CO_2$ offsetting package 210 is originally purchased by original equipment manufacturer (OEM), or that local governments would provide incentives for package purchases.

The $CO_2$ offsetting package 210 is monitored by the original equipment manufacturer (OEM), central provider, or joint venture in regard to any incoming emissions data. This enables the original equipment manufacturer (OEM), central provider, or joint venture to provide feedback on the status of the $CO_2$ offsetting package 118, including used and unused credits, as well as what offsets have been performed as a result of the purchase. Results of that status is defined with an offsetting package status report 212.

The offsetting package status report 212 may be provided with ongoing emissions reports 208, or as a separate report all together. This offsetting package status report 212 may be provided to the package owner on a regular periodic basis, as package credits run-out, or when the credits have fallen below a pre-determined limit. As discussed above, the pre-determined limit may be customized by vehicle and package owner. It is also possible that the vehicle and package owner may access instantaneous feedback through a secure web interface. Additionally, credit status, in data format, may be sent to the vehicle transmission device 202, to be displayed within the on-board display 300, a mobile CE device and/or home PC.

Figure 14:
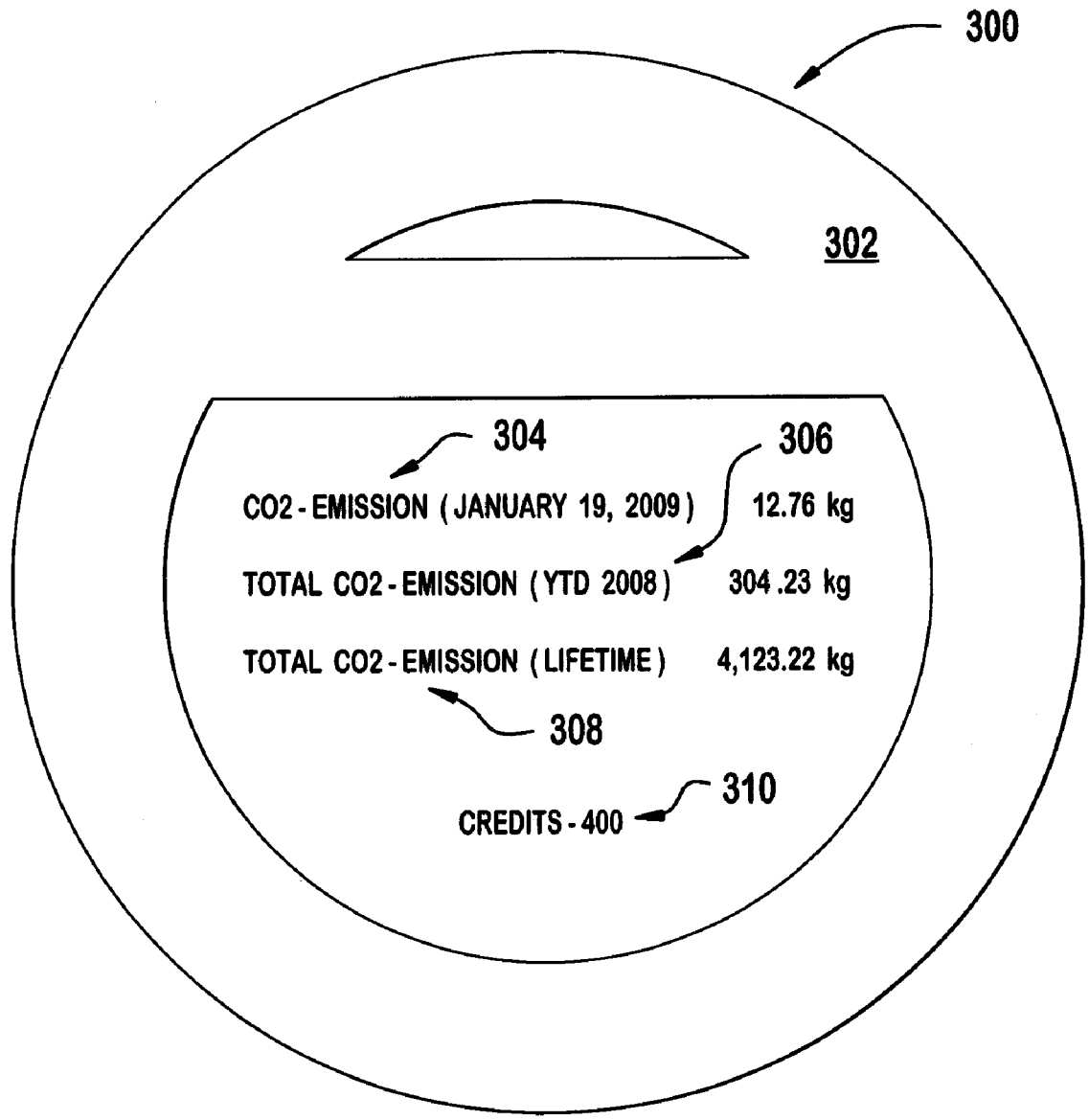
FIG. 14 illustrates a telematics infrastructure utilized in the CO2 emissions offsetting system.

FIG. 14 shows one embodiment of the on-board display 300. The on-board display 300, includes a display screen 302 which details emissions and collected data to the vehicle owner or operator. $CO_2$ emissions data, including daily $CO_2$ emissions 304, yearly $CO_2$ emissions, as well as lifetime $CO_2$ emissions data may be displayed within the display window. However, it is possible to include less or more information depending on the embodiment. In the embodiment shown, $CO_2$ offsetting package 210 credit status is also displayed. Additionally, it is conceivable that the on-board display 300 includes gas consumption, gas mileage, and other readings, as well as feedback on the project selected (i.e. reforestation, renewable energy used, etc.).

Once the vehicle owner selects the appropriate $CO_2$ offsetting package 210, and the original equipment manufacturer (OEM), central provider, or joint venture has deemed the vehicle as carbon neutral, the vehicle owner will be provided with an indicator 214, designating the vehicle as carbon neutral.

Figure 15:
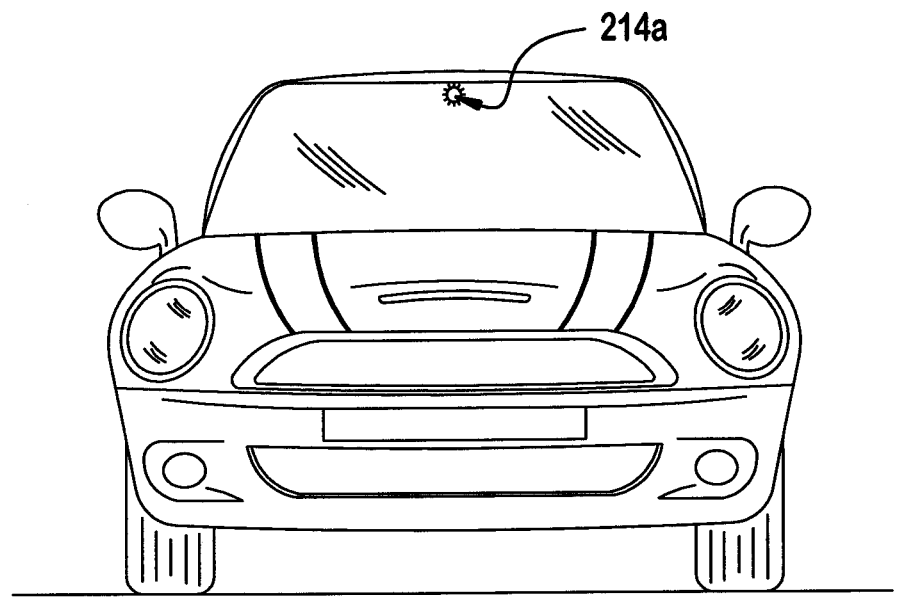
FIG. 15 represents several depictions on a carbon neutral indicator included with the CO2 emissions offsetting system.
Figure 15:
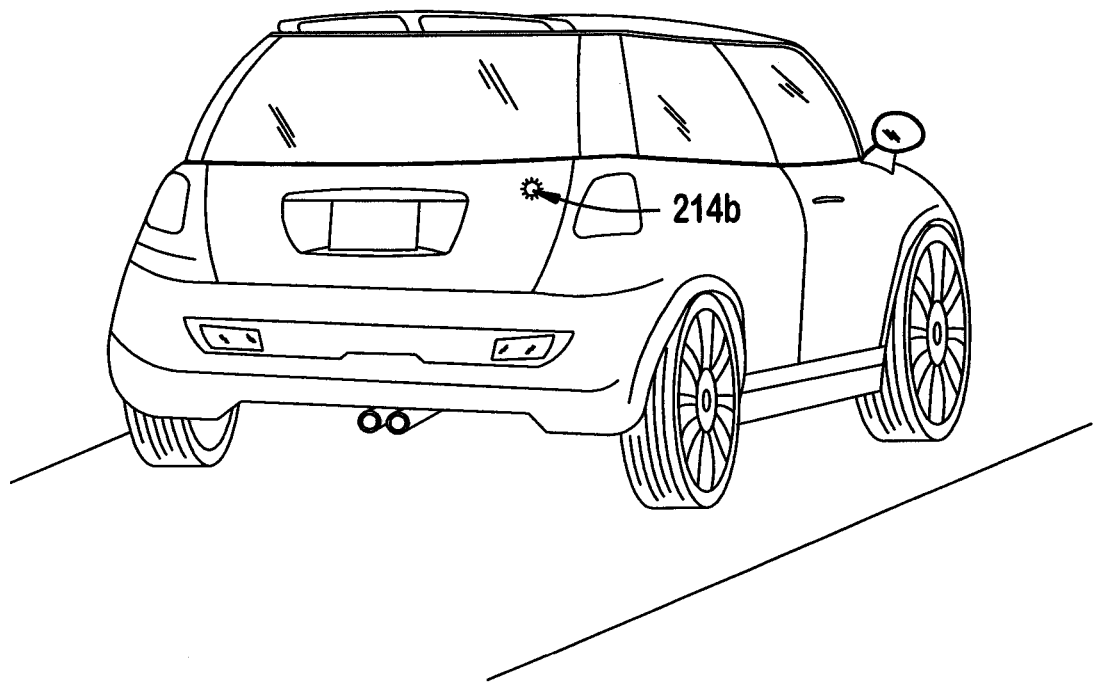

In the present invention, the indicator 214, designating that the $CO_2$ emissions have been neutralized, is a visual indicator 214a, 214b, as shown in FIG. 15. The visual indicator 214a is includes as a small green light in the front window of the vehicle. However, it is also possible to include a visual indicator 214b on the rear end of the vehicle. Depending on restrictions or preference, the visual indicator 214 may be positioned anywhere in or on the vehicle and with any device capable of displaying that the vehicle is carbon neutral. In fact, the indicator 214 may be displayable on a mobile CE device (e.g. picture or video sent to mobile phone) or even an acoustic signal.

Additionally, it is possible that the indicator 214 is a physical certificate that designates that the $CO_2$ emissions have been neutralized. The certificate may be a paper certificate, electronic certificate or a sticker, as discussed in U.S. Pat. No. 7,343,341.

The foregoing illustrates some of the possibilities for practicing the invention. Many other embodiments are possible within the scope and spirit of the invention. It is, therefore, intended that the foregoing description be regarded as illustrative rather than limiting, and that the scope of the invention is given by the appended claims together with their full range of equivalents.

What is claimed is:

1. A method to offset $CO_2$ emissions, comprising the steps of:
    capturing $CO_2$ emissions data from a vehicle emissions measuring device;
    transmitting emissions data by a transmission device to a data collection unit, the data collection unit storing collected $CO_2$ emissions data;
    preparing a $CO_2$ emission report using the collected data;
    sharing the report with a vehicle owner through correspondence;
    offering a variety of $CO_2$ offsetting packages to offset the captured $CO_2$ emissions data;
    selecting a customized $CO_2$ offsetting package from the variety of $CO_2$ offsetting packages and corresponding to the captured $CO_2$ emissions data;
    monitoring the customized $CO_2$ offsetting package and collected $CO_2$ emissions data with respect to the customized $CO_2$ offsetting package; and
    receiving credits through the customized $CO_2$ offsetting package, the credits corresponding to offset $CO_2$ released from the vehicle.

2. The method to offset $CO_2$ emissions of claim 1, wherein the emissions measuring device is an on-board calculation module.

3. The method to offset $CO_2$ emissions of claim 2, wherein the emissions measuring device determines the $CO_2$ emissions data by gauging an odometer reading.

4. The method to offset $CO_2$ emissions of claim 3, wherein the emissions measuring device determines the $CO_2$ emissions data by estimating an odometer reading.

5. The method to offset $CO_2$ emissions of claim 2, wherein capturing the $CO_2$ emissions data is performed real time.

6. The method to offset $CO_2$ emissions of claim 2, wherein capturing the $CO_2$ emissions data is performed at a periodic interval.

7. The method to offset $CO_2$ emissions of claim 6, wherein capturing the $CO_2$ emissions data is performed when the vehicle is serviced by a vehicle service center.

8. The method to offset $CO_2$ emissions of claim 1, wherein capturing the $CO_2$ emissions data includes readings by a vehicle service center.

9. The method to offset $CO_2$ emissions of claim 8, wherein capturing the $CO_2$ emissions data includes gauging an odometer reading.

10. The method to offset $CO_2$ emissions of claim 9, wherein capturing the $CO_2$ emissions data includes estimating $CO_2$ emissions through an odometer reading with a fuel emissions factor.

11. The method to offset $CO_2$ emissions of claim 8, wherein capturing the $CO_2$ emissions data includes estimating an odometer reading.

12. The method to offset $CO_2$ emissions of claim 8, wherein transmitting the $CO_2$ emissions data is performed by the vehicle service center.

13. The method to offset $CO_2$ emissions of claim 1, wherein capturing the $CO_2$ emissions data is performed for an individual vehicle owner.

14. The method to offset $CO_2$ emissions of claim 1, wherein capturing the $CO_2$ emissions data is performed for a fleet of vehicles.

15. The method to offset $CO_2$ emissions of claim 1, further comprising the step of displaying the $CO_2$ emissions data through a vehicle $CO_2$ meter.

16. The method to offset $CO_2$ emissions of claim 1, wherein transmitting the $CO_2$ emissions data includes use of a telematic infrastructure.

17. The method to offset $CO_2$ emissions of claim 16, further comprising the step of performing telematics through wireless data communication between the vehicle and the data collection unit.

18. The method to offset $CO_2$ emissions of claim 16, further comprising the step of performing vehicle telematics through wireless data communication.

19. The method to offset $CO_2$ emissions of claim 1, wherein transmitting the $CO_2$ emissions data is performed using a computer link.

20. The method to offset $CO_2$ emissions of claim 1, further comprising a step of registering and storing of the $CO_2$ emissions data by the data collection unit.

21. The method to offset $CO_2$ emissions of claim 1, further comprising the step of detailing actual $CO_2$ emissions production.

22. The method to offset $CO_2$ emissions of claim 21, further comprising the step of generating a brand specific fleet $CO_2$ balance sheet.

23. The method to offset $CO_2$ emissions of claim 21, further comprising the step of calculating of a brand specific fuel consumption report.

24. The method to offset $CO_2$ emissions of claim 1, further comprising the step of transmitting the $CO_2$ emissions report on a periodic basis.

25. The method to offset $CO_2$ emissions of claim 24, further comprising the step of transmitting the $CO_2$ emissions report to a vehicle owner.

26. The method to offset $CO_2$ emissions of claim 24, further comprising the step of transmitting the $CO_2$ emissions report to a fleet owner.

27. The method to offset $CO_2$ emissions of claim 24, further comprising the step of transmitting the $CO_2$ emissions at a scheduled time.

28. The method to offset $CO_2$ emissions of claim 24, further comprising the step of transmitting the $CO_2$ emissions report through a postal service.

29. The method to offset $CO_2$ emissions of claim 24, further comprising the step of transmitting the $CO_2$ emissions report electronically.

30. The method to offset $CO_2$ emissions of claim 1, further comprising the step of providing status feedback on selected $CO_2$ compensation package.

31. The method to offset $CO_2$ emissions of claim 30, further comprising the step of providing status feedback on a periodic basis.

32. The method to offset $CO_2$ emissions of claim 30, further comprising the step of providing status feedback when the credits run-out.

33. The method to offset $CO_2$ emissions of claim 30, further comprising the step of providing status feedback when the credits fall below a limit.

34. The method to offset $CO_2$ emissions of claim 30, further comprising the step of customizing the credit limit.

35. The method to offset $CO_2$ emissions of claim 30, further comprising the step of providing feedback of the progress of a project defined by the selected $CO_2$ offsetting package.

36. The method to offset $CO_2$ emissions of claim 30, wherein feedback is displayed through an on-board display.

37. The method to offset $CO_2$ emissions of claim 30, wherein feedback is displayed through a mobile device.

38. The method to offset $CO_2$ emissions of claim 1, further comprising the step of accessing $CO_2$ compensation package status on selected $CO_2$ compensation package.

39. The method to offset $CO_2$ emissions of claim 1, further comprising the step of indicating that $CO_2$ emissions have been neutralized.

40. The method to offset $CO_2$ emissions of claim 39, further comprising the step of signaling that $CO_2$ emissions have been neutralized with a visual indicator.

41. The method to offset $CO_2$ emissions of claim 40, further comprising the step of signaling that $CO_2$ emissions have been neutralized with a certificate.

42. The method to offset $CO_2$ emissions of claim 1, further comprising the step of temporary storing data in an on-board device.

43. The method to offset $CO_2$ emissions of claim 1, further comprising the step of temporary storing data in a mobile.

44. A $CO_2$ emissions offsetting system, comprising:
a vehicle emissions measuring device that captures $CO_2$ emissions data;
a transmission device to send collected data to a data collection unit, the unit having databases to store incoming data;
a $CO_2$ emission report generated by the data collection unit and shared with a owner of the vehicle;
a variety of $CO_2$ offsetting programs offered to the vehicle owner, a selected $CO_2$ compensation package that offsets the $CO_2$ emissions through purchased credits; and
a plurality of subsequent status reports including the status of the selected $CO_2$ compensation package with respect to used and unused credits.

45. The $CO_2$ emissions offsetting system of claim 44, wherein the vehicle emissions measuring device is an on-board calculation module.

46. The $CO_2$ emissions offsetting system of claim 45, wherein the vehicle emissions measuring device is an odometer.

47. The $CO_2$ emissions offsetting system of claim 44, wherein the vehicle emissions measuring device is a vehicle service center calculation module.

48. The $CO_2$ emissions offsetting system of claim 44, wherein the vehicle emissions measuring device captures $CO_2$ emissions data for an individual vehicle owner.

49. The $CO_2$ emissions offsetting system of claim 44, the vehicle emissions measuring device captures $CO_2$ emissions data for a fleet of vehicles.

50. The $CO_2$ emissions offsetting system of claim 44, the vehicle emissions measuring device captures $CO_2$ emissions data during real time.

51. The $CO_2$ emissions offsetting system of claim 44, the vehicle emissions measuring device captures $CO_2$ emissions data per drive.

52. The $CO_2$ emissions offsetting system of claim 44, the vehicle emissions measuring device captures $CO_2$ emissions data over at specified period of time.

53. The $CO_2$ emissions offsetting system of claim 52, wherein the $CO_2$ emissions data is captured at a periodic interval.

54. The $CO_2$ emissions offsetting system of claim 52, wherein the $CO_2$ emissions data is captured when the vehicle is serviced at a vehicle service center.

55. The $CO_2$ emissions offsetting system of claim 44, wherein the $CO_2$ emissions data is displayed using a vehicle $CO_2$ meter.

56. The $CO_2$ emissions offsetting system of claim 44, wherein the transmission device is a vehicle transmission device that is part of a telematic infrastructure, the telematic infrastructure capable of sending and receiving $CO_2$ emissions data.

57. The $CO_2$ emissions offsetting system of claim 44, wherein the telematic infrastructure sends and receives $CO_2$ emissions data from a vehicle transmission device to data collection unit databases.

58. The $CO_2$ emissions offsetting system of claim 57, wherein the telematic infrastructure is a wireless data communication between the vehicle and the data collection unit.

59. The $CO_2$ emissions offsetting system of claim 57, wherein the telematic infrastructure is a computer link between the vehicle and the data collection unit.

60. The $CO_2$ emissions offsetting system of claim 44, wherein the transmission device is a vehicle service center transmission device, the vehicle service center transmission device being a part of a telematic infrastructure which is capable of sending and receiving $CO_2$ emissions data.

61. The $CO_2$ emissions offsetting system of claim 60, wherein the telematic infrastructure sends and receives $CO_2$ emissions data from a service center transmission device to a data collection unit database.

62. The $CO_2$ emissions offsetting system of claim 61, wherein the telematic infrastructure is a telematics infrastructure using wireless data communication.

63. The $CO_2$ emissions offsetting system of claim 44, wherein the data collection unit database stores registration and emissions data.

64. The $CO_2$ emissions offsetting system of claim 63, wherein the emissions data stored is actual $CO_2$ emissions data.

65. The $CO_2$ emissions offsetting system of claim 63, wherein the emissions data stored is estimated $CO_2$ emissions data.

66. The $CO_2$ emissions offsetting system of claim 44, the $CO_2$ emission report includes a brand specific fuel consumption report.

67. The $CO_2$ emissions offsetting system of claim 44, the $CO_2$ emission report includes a individual vehicle owner $CO_2$ balance sheet.

68. The $CO_2$ emissions offsetting system of claim 44, the $CO_2$ emission report includes a brand specific fleet $CO_2$ balance sheet.

69. The $CO_2$ emissions offsetting system of claim 44, the $CO_2$ emission report is a periodic $CO_2$ emission report.

70. The $CO_2$ emissions offsetting system of claim 44, the $CO_2$ emission report is a paper $CO_2$ emission report.

71. The $CO_2$ emissions offsetting system of claim 44, the $CO_2$ emission report is an electronic $CO_2$ emission report.

72. The $CO_2$ emissions offsetting system of claim 44, wherein the plurality of subsequent status reports is a recurring paper report.

73. The $CO_2$ emissions offsetting system of claim 44, wherein the plurality of subsequent status reports is a recurring electronic report.

74. The $CO_2$ emissions offsetting system of claim 44, wherein the plurality of subsequent status reports is a virtual report accessed through a website.

75. The $CO_2$ emissions offsetting system of claim 44, wherein the plurality of subsequent status reports is provided when the credits fall below a limit.

76. The $CO_2$ emissions offsetting system of claim 75, wherein the credit limit is a customized credit limit.

77. The $CO_2$ emissions offsetting system of claim 75, wherein the credit limit is a pre-determined credit limit.

78. The $CO_2$ emissions offsetting system of claim 44, wherein the plurality of subsequent status reports includes feedback of the progress of a project defined by the selected $CO_2$ offsetting package.

79. The $CO_2$ emissions offsetting system of claim 44, wherein the plurality of subsequent status reports is displayed through an on-board display.

80. The $CO_2$ emissions offsetting system of claim 44, wherein the plurality of subsequent status reports is displayed through a mobile device.

81. The $CO_2$ emissions offsetting system of claim 44, further comprising an indicator that signals that the vehicle $CO_2$ emissions have been neutralized through the selected $CO_2$ offsetting package.

82. The $CO_2$ emissions offsetting system of claim 81, wherein the indicator is a visual indicator.

83. The $CO_2$ emissions offsetting system of claim 81, wherein the indicator is a certificate.

\* \* \* \* \*